United States Patent
Koryakin et al.

(10) Patent No.: US 11,301,283 B1
(45) Date of Patent: *Apr. 12, 2022

(54) VIRTUALIZATION EXTENSION MODULES

(71) Applicant: Parallels International GmbH, Schaffhausen (CH)

(72) Inventors: Alexey Koryakin, Moscow (RU); Nikolay Dobrovolskiy, Moscow (RU); Serguei M. Beloussov, Singapore (SG)

(73) Assignee: Parallels International GmbH, Schaffhausen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 16/550,602

(22) Filed: Aug. 26, 2019

Related U.S. Application Data

(63) Continuation of application No. 15/341,445, filed on Nov. 2, 2016, now Pat. No. 10,452,420.

(51) Int. Cl.
G06F 9/455 (2018.01)

(52) U.S. Cl.
CPC ........... *G06F 9/45558* (2013.01); *G06F 2009/45575* (2013.01); *G06F 2009/45579* (2013.01)

(58) Field of Classification Search
None
See application file for complete search history.

(56) References Cited

U.S. PATENT DOCUMENTS

| | | | |
|---|---|---|---|
| 8,091,086 B1 * | 1/2012 | Ershov | G06F 9/45545 718/1 |
| 9,003,402 B1 | 4/2015 | Carbone et al. | |
| 9,311,126 B2 * | 4/2016 | Edwards | G06F 21/64 |
| 10,073,712 B1 | 9/2018 | Au et al. | |
| 10,452,420 B1 * | 10/2019 | Koryakin | G06F 9/45558 |
| 2005/0246453 A1 | 11/2005 | Erlingsson et al. | |
| 2008/0288940 A1 * | 11/2008 | Adams | G06F 9/45558 718/1 |
| 2009/0293057 A1 * | 11/2009 | Larkin | G06F 9/45558 718/1 |
| 2013/0061293 A1 * | 3/2013 | Mao | G06F 9/468 726/4 |
| 2015/0188788 A1 | 7/2015 | Kolesnik et al. | |
| 2015/0199513 A1 * | 7/2015 | Ismael | G06F 21/552 726/22 |
| 2015/0199532 A1 * | 7/2015 | Ismael | G06F 21/552 726/30 |

(Continued)

OTHER PUBLICATIONS

Yamamoto et al., "Unified Performance Profiling of an Entire Virtualized Environment", 2014, IEEE, pp. 106-115. (Year: 2014).*

(Continued)

*Primary Examiner* — Kenneth Tang
(74) *Attorney, Agent, or Firm* — Rosenberg, Klein & Lee

(57) ABSTRACT

Systems and methods for processing virtual machine I/O requests by virtualization extension modules. An example method comprises: receiving, by a virtual machine monitor (VMM) running on a host computer system, a request initiated by a virtual machine managed by the VMM; processing the request by a VMM extension module identified by one or more parameters of the request; invoking, by the VMM extension module, an application programming interface (API) exported by the VMM to perform an action identified by the request; and resuming execution of the virtual machine.

6 Claims, 4 Drawing Sheets

(56) References Cited

U.S. PATENT DOCUMENTS

| | | |
|---|---|---|
| 2017/0053118 A1 | 2/2017 | Malkov et al. |
| 2017/0185436 A1* | 6/2017 | Deng .................. G06F 9/45558 |
| 2018/0004558 A1* | 1/2018 | Das Sharma ....... G06F 13/1663 |
| 2018/0018244 A1* | 1/2018 | Yoshimura ............ G06F 9/5077 |
| 2019/0026136 A1* | 1/2019 | Nair .................... G06F 9/45533 |

OTHER PUBLICATIONS

Yamamoto et al. "Unified Performance Profiling of an Entire Virtualized Environment", 2014, IEEE Xplore, pp. 106-115. (Year: 2014).*

Shi et al., "vCUDA: GPU-Accelerated High-Performance Computing in Virtual Machines", IEEE Transactions on Computers, vol. 61 , No. 6, Jun. 2012, pp. 804-816. (Year: 2012).*

USPTO, Office Action for U.S. Appl. No. 15/341,445, dated Sep. 21, 2018.

USPTO, Final Office Action for U.S. Appl. No. 15/341,445, dated Apr. 5, 2019.

USPTO, Notice of Allowance for U.S. Appl. No. 15/341,445, dated Jun. 12, 2019.

\* cited by examiner

VIRTUALIZATION EXTENSION MODULES

RELATED APPLICATIONS

This application is a continuation of U.S. patent application Ser. No. 15/341,445 filed on Nov. 2, 2016, the entire content of which is incorporated by reference herein.

TECHNICAL FIELD

The present disclosure is generally related to computer systems, and is specifically related to systems and methods for employing virtualization extension modules for improving the efficiency of executing applications by virtual machines.

BACKGROUND

Virtualization may be viewed as abstraction of hardware components into logical objects in order to allow a computer system to execute various software modules, for example, multiple operating systems, concurrently and in isolation from other software modules. Virtualization may be achieved by running a software layer, often referred to as a "virtual machine monitor," above the hardware and below the virtual machines. The virtual machine monitor may abstract the physical layer and present this abstraction to virtual machines to use, by providing interfaces between the underlying hardware and virtual devices of virtual machines. For example, processor virtualization may be implemented by the hypervisor scheduling time slots on one or more physical processors for a virtual machine, rather than a virtual machine actually having a dedicated physical processor.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
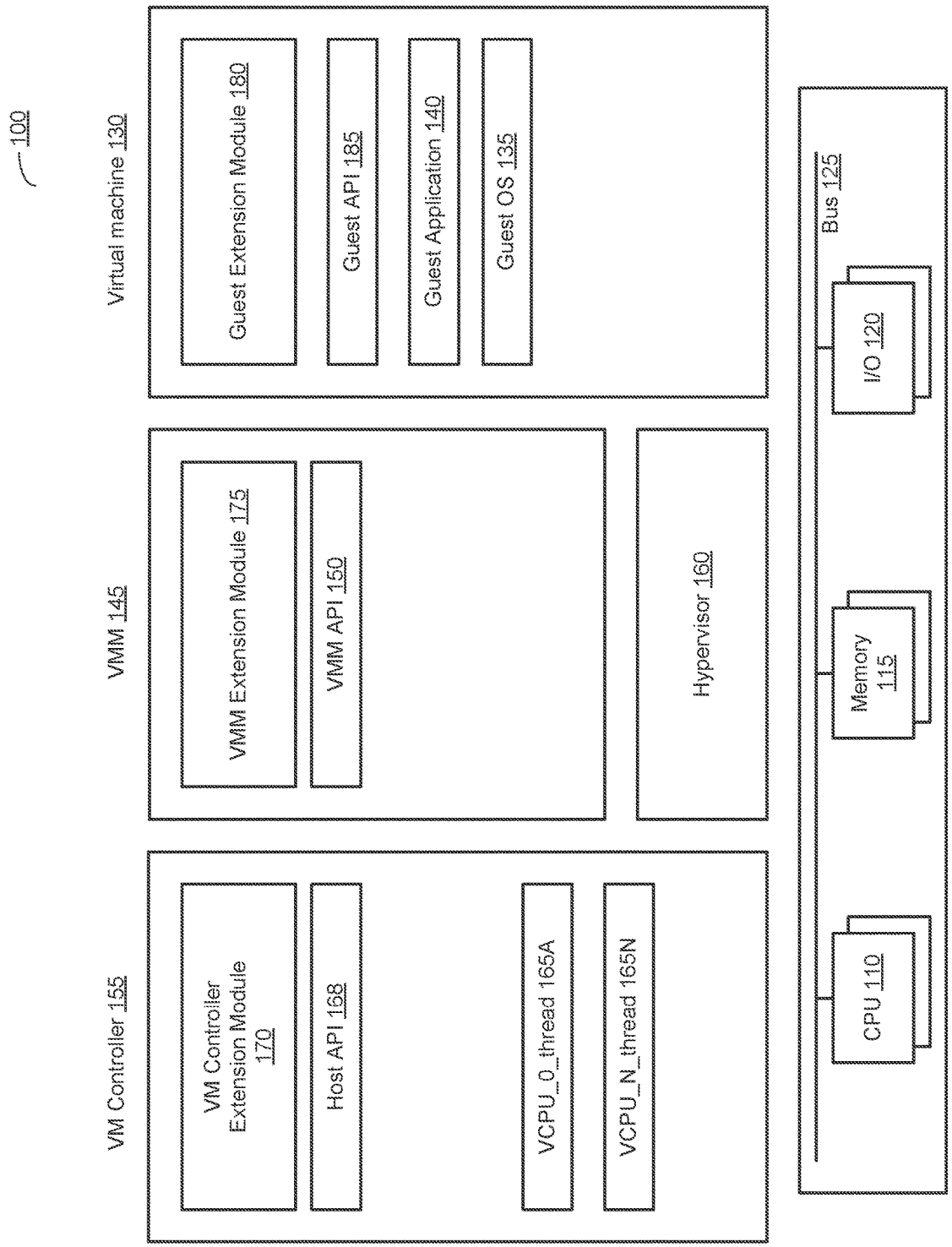
FIG. 1 depicts a high-level diagram of an example computer system 100 in which the virtualization extension modules may be implemented, in accordance with one or more aspects of the present disclosure.

Described herein are systems and methods for processing virtual machine I/O requests by virtualization extension modules of a three-tiered virtualization architecture.

A virtual execution environment implemented by a host computer system may comprise a virtual machine monitor (VMM) facilitating execution of one or more virtual machines, each of which may run a guest OS managing one or more applications. The VMM may emulate the underlying hardware platform (e.g., the x86 platform), including emulating the processor, memory, and peripheral devices (such as network interface controllers, hard disk controllers, etc.). In certain implementations, the VMM may be executed in a separate privileged context, which is isolated from the kernel context of the host operating system. Alternatively, the VMM may be executed in the host kernel context or the host user space context.

For improving efficiency and portability of the virtualization architecture, the virtual machine management functions (including virtual machine creation, execution, and termination) may be performed by a VM controller application running in a non-privileged execution mode in the user space of the host. The VM controller application may include a separate processing thread for each virtual processor (VCPU) of the corresponding virtual machine. Within each thread, the VM controller application may invoke, via an optional hypervisor layer, functions of the VMM for performing the platform emulation or getting access to virtual machine run-time data, as described in more details herein below.

Due to the multi-layered virtualization architecture, interactions between the VM controller application and the virtual machine may involve a series of execution control transfers between multiple abstraction layers, thus adversely affecting the operational efficiency of the virtualization system. The present disclosure improves the functionality and efficiency of virtualization environments implemented by general purpose or specialized computing devices, by employing virtualization extension modules that leverage synchronous and/or asynchronous communication facilities of virtual machines with the VMM, thus allowing efficiently shift to the VMM and/or VM controller layers at least some of the functionality that would otherwise be performed by guest applications, thus reducing the number of execution control transfers. The virtualization extension modules implemented in accordance with one or more aspects of the present disclosure may include a VM controller extension module running in the context of the VM controller application, a VMM extension module running in the context of the VMM, and a guest extension module running in the context of the virtual machine, as described in more details herein below.

The systems and methods described herein may be implemented by hardware (e.g., general purpose and/or specialized processing devices, and/or other devices and associated circuitry), software (e.g., instructions executable by a processing device), or a combination thereof. Various aspects of the above referenced methods and systems are described in details herein below by way of examples, rather than by way of limitation.

FIG. 1 depicts a high-level diagram of an example computer system 100 in which virtualization modules operating in accordance with one or more aspects of the present disclosure may be implemented. The computer system 100 may include one or more central processing units (CPU) 110, also referred to as "processors" herein, which may be communicatively coupled to one or more memory devices 115 and one or more input/output (I/O) devices 120 via a system bus 125.

"Processor" herein refers to a device capable of executing instructions handling data in registers or memory, encoding arithmetic, logical, control flow, floating point or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module. A processor may also be referred to as a central processing unit (CPU). "Memory device" herein refers to a volatile or non-volatile memory, such as RAM, ROM, EEPROM, or any other device capable of storing data. "I/O device" herein refers to a device capable of inputting and/or outputting binary data. In an illustrative example, an I/O device may be provided by a network interface controller (NIC) or a block I/O device, such as a hard disk controller.

In accordance with one or more aspects of the present disclosure, the computer system 100 may implement a virtual execution environment for executing code that may have been originally developed for other platforms. The virtual execution environment may comprise one or more virtual machines 130, each of which may run a guest OS 135 managing one or more applications 140.

In certain implementations, the virtual execution environment may be implemented using hardware-assisted virtualization features of the processor 110, which may support executing, at an elevated privilege level, a VMM that acts as a host and has the full control of the processor and other platform hardware. A VMM presents a virtual machine with an abstraction of one or more virtual processors. A VMM is able to retain selective control of processor resources, physical memory, interrupt management, and input/output (I/O). A virtual machine implements a software environment which may be represented by a stack including a guest operating system (OS) and application software. A virtual machine may operate independently of other virtual machines and use the VMM-facilitated interface to the processors, memory, storage, graphics, and I/O provided by a physical platform, so that the VMM may retain the full control of the physical platform resources.

A transition from the VMM execution mode (also referred to as VMX root operation in certain processor architectures) to the guest execution mode (also referred to as VMX non-root operation) is referred to as a VM entry and may be performed by invoking a special Instruction Set Architecture (ISA)-dependent instruction (e.g., VMLAUNCH/VMRESUME or VMRUN instructions). The reverse transition, i.e., transition from the guest execution mode to the VMM execution mode is referred to as a VM exit and is initiated by the VMM to force processor to switch the execution mode in response to detecting one of the triggering events (such as an attempt to execute a certain privileged instruction or to access a certain memory address), as described in more details herein below.

Thus, when executed in the guest execution mode, certain instructions and events, instead of their ordinary operation, cause VM exits to the VMM. Because these VM exits modify the virtual processor's ordinary behavior, the functionality of software in the guest execution mode is limited by certain pre-configured restrictions for the code being executed. It is this very limitation that allows the VMM to retain the full control of processor resources and prevent the virtual machine from executing an operation that would corrupt the host state. Because the guest execution mode places restrictions even on software running on the virtual processor with the current privilege level (CPL) of zero, the guest software may run at the privilege level for which it was originally designed.

In the absence of hardware-assisted virtualization support by the processor 110, binary translation may be implemented for translating instructions to be executed by the virtual machine 130 to the instruction set supported by the processor 110 and/or for shifting the execution privilege levels in the guest execution mode. As an alternative to binary translation technique, a so-called software debugger method may be used for the guest code execution.

Execution of the virtual machine 130 may be facilitated by the VMM 145 that may emulate the underlying hardware platform (e.g., the x86 platform), including emulating the processor, memory, and peripheral devices (e.g., network interface controllers, hard disk controllers, etc.). In certain implementations, the VMM 145 may be executed in a separate privileged context, which is isolated from the kernel context of the host computer system 100. The VMM 145 may be loaded by a dedicated boot loader that is separate from the boot loader of the host operating system. In various alternative implementations, the VMM 145 may be executed in the host kernel context or the host user space context.

The VMM 145 may utilize a VMM API 150 for privileged-level access to the host platform, including the processor 110, memory 115, and peripheral devices (e.g., network interface controllers, hard disk controllers, etc.) 120. In certain implementations, the VMM 145 may be designed to perform all host interactions via the VMM API 150, thus facilitating cross-platform portability of the VMM 145: the same code base may be re-compiled for another target platform that implements the VMM API 150.

For improving efficiency and portability of the virtualization architecture, the virtual machines 130 may be managed (including virtual machine creation, execution, and termination) by one or more instances of the VM controller application 155 running in a non-privileged execution mode (e.g., at the current privilege level (CPL) of 3) in the user space of the host computer system 100. The VM controller application 155 may include a separate processing thread 165A-165N for each virtual processor (VCPU) of the corresponding virtual machine 130. Within each thread, the VM controller application 155 may invoke, via the hypervisor 160, functions of the VMM 145 for performing the platform emulation, including emulating the processor, memory, and peripheral devices (e.g., network interface controllers, hard disk controllers, etc.). In certain implementations, the hypervisor 160 may act as the interface between the VM controller application 155 and the VMM 145 and may further providing low-level resource management, such as memory allocation, address translation, etc. Alternatively, the functionality of hypervisor 160 may be merged into the VMM 145.

The VM controller application 155 may utilize the host API 168 for access various host functions, e.g., system calls implementing I/O functions, memory allocation functions, etc. In certain implementations, the VM controller application 155 may communicate with a visualization application (not shown in FIG. 1 for clarity and conciseness) that implements a graphical user interface (GUI) intercepting user input and displaying graphical output generated by the guest software.

Thus, the virtualization architecture implemented in accordance with one or more aspects of the present disclosure may include three functional modules: the VM controller application 155 running in the user space context of the host computer system 100, the VMM 145 running in a separate privileged execution mode context which is isolated from the kernel context of the host computer system 100, and the virtual machine 130 executing one or more guest applications managed by the guest OS 135.

In an illustrative example, responsive to being invoked (e.g., via an API call) by the VM controller application 155 for running a VM, the VMM 145 may initialize a corresponding virtual machine control structure (VMCS), save the host context, and transfer the execution control to the virtual machine 130 by executing a VM entry instruction (e.g., VMLAUNCH). The VM entry instruction causes execution of the guest code in the guest execution mode until a privileged operation is attempted. Such a privilege operation would cause a VM exit, thus transferring the execution control back to the VMM 145.

Responsive to receiving the execution control, the VMM 145 may restore the previously saved host context, optionally perform some additional processing with respect to the VM exit, and transfer the execution control to VM controller application 155 by returning from the API call that was executed by the VM controller application 155 to cause the guest code execution. Responsive to receiving the execution control, the VM controller application 155 may analyze the cause of the VM exit (e.g., by executing API calls to the hypervisor 160 and/or VMM 145 to read VMCS fields and/or guest registers or by analyzing information received within a corresponding API request from the VMM). Then, the VM controller application 155 may take appropriate action in response to the VM exit and execute a new API call in order to request the VMM 145 to continue executing the guest code. VM controller application may process any kind VM and VMM requests involved in the complex virtualization. These requests are associated with the virtualization mechanisms distributed among the virtualization components 145, 160, 175, 130, 180, 140 and 135 and their respective contexts. A direct mapping between a certain VM exit and a request to VM controller application is not always necessary or present. In an illustrative example, the VMM's emulating a certain device may involve issuing a data request to the host API to reflect the device interaction with real hardware resources.

In certain implementations, communications of virtual machines 130 with the VMM 145 may be facilitated by the guest API 185. In an illustrative example, the guest API 185 may implement an API call for synchronous communications of virtual machines 130 with the VMM 145. The API call may receive one or more parameters specifying the operation to be performed (e.g., read the host time, read from a receiving buffer of a specified network interface controller, etc.), write the parameter values into one or more general purpose registers of the corresponding virtual processor, and invoke a pre-defined instruction (such as VMCALL or RDPMC instruction for reading the performance monitoring counter specified by the ECX register or OUT instruction to write to an I/O port specified by the instruction operand). Executing the instruction by the virtual processor would trigger a VM exit, thus transferring the execution control to the VMM 145.

Responsive to receiving the execution control, the VMM 145 may restore the previously saved host context, optionally perform some additional processing with respect to the VM exit, and transfer the execution control to VM controller application 155 by returning from the API call that was executed by the VM controller application 155 to cause the guest code execution. Responsive to receiving the execution control, the VM controller application 155 may analyze the cause of the VM exit (e.g., by executing API calls to the hypervisor 160 and/or VMM 145 to read VMCS fields and/or guest registers or by analyzing information received within a corresponding API request from the VMM). Then, the VM controller application 155 may perform the requested operation (e.g., read the host time, read from a receiving buffer of a specified network interface controller, etc.), save the result into one or more the guest general purpose registers, and execute a new API call in order to request the VMM 145 to continue executing the guest code.

The above-described synchronous communications mechanism leads to several context switching and associated processor cache resets, which may adversely affect the overall efficiency of the virtualization system. Thus, additionally or alternatively to the synchronous communications mechanism, the guest API 185 may implement an API call for asynchronous communications of virtual machines 130 with the VMM 145. The API call may receive one or more parameters specifying the operation to be performed (e.g., read the data from a receiving buffer of a specified network interface controller, etc.), write the parameter values into one or more general purpose registers of the corresponding virtual processor, and invoke a custom PCI device driver for a fictitious PCI device that implements direct memory access (DMA) functionality. DMA herein refers to a hardware-assisted mechanism that allows peripheral devices to transfer their I/O data directly to and from the system memory without involving the processor in the transfer.

Responsive to receiving the I/O operation request, the custom PCI device driver may allocate one or more memory buffers to be used for the DMA transfer by the associated peripheral device (e.g., the network interface controller). In an illustrative example, if a memory buffer of the requisite size could not be allocated as a contiguous physical memory buffer, several memory buffers occupying a non-contiguous physical memory space may be allocated instead, and a pointer to a scatterlist referencing a plurality of pointers to the individual memory buffers may be supplied to the associated peripheral device. The pointers may be stored in DMA descriptors residing in the guest memory, which are linked to each other to tie the scattered memory buffers into a single logical one. A pointer to the head descriptor may be written into an emulated register of a custom PCI device, thus triggering a corresponding VM exit to the VMM and further emulation actions. In certain implementations, an emulated write to the device command register or a series of emulated events may occur. Such an emulated event may initiate an emulated asynchronous DMA operation using a joint buffer allocated by the custom PCI device driver. An asynchronous API call to the VM controller application may ensue to start a parallel emulation of the DMA operation on the VM controller application side. Until the emulated DMA asynchronous operation is completed, the guest OS scheduler may utilize the VCPU to execute other code without waiting on the DMA operation completion (unlike a scenario involving a synchronous call). Once the operation is completed by the VM controller application, a guest interrupt is asserted to the guest OS thus returning the execution control to the custom PCI device driver in order to complete the asynchronous operation on the VM side.

An emulated event or interrupt may be utilized to signal the availability of the above-described DMA buffer, thus triggering a VM exit. Responsive to receiving the execution control, the VMM 145 may restore the previously saved host context, and either perform the requested operation itself or transfer the execution control to VM controller application 155 by returning from the API call that was executed by the VM controller application 155 to cause the guest code execution. Responsive to receiving the execution control, the VM controller application 155 may detect the operation type from the request or analyze the cause of the VM exit by executing API calls to the hypervisor 160 and/or VMM 145 to read VMCS fields and/or guest general purpose registers. Then, the VM controller application 155 may initiate the requested operation (e.g., append the I/O request to a queue of I/O requests to be processed by a dedicated thread running within the context of the VM controller application 155), and, without waiting for completion of the requested I/O operation, continue executing the guest code by executing a new API call to the VMM 145.

Asynchronous DMA operation processing is described herein above as an illustrative example only. In general, any kind of API requests from VMM/VM to the VM controller application may be performed in an asynchronous way. Such operations may utilize a shared buffer for asynchronous data processing and request completion even signaling.

Thus, a typical interaction between the VM controller application 155 and the virtual machine 130 may involve a series of execution control transfers between multiple abstraction layers represented by the VMM 145 and hypervisor 160. Those execution control transfers represent the execution overhead and may adversely affect the operational efficiency of the virtualization solution. Systems and methods of the present disclosure improve the operational efficiency of the virtualization system by employing virtualization extension modules that leverage synchronous and/or asynchronous communication facilities of virtual machines with the VMM thus allowing efficiently shift to the VMM and/or VM controller layers at least some of the functionality that would otherwise be performed by guest applications, thus reducing the number of execution control transfers. As noted herein above, the virtualization extension modules may include the VM controller extension module 170 running in the context of the VM controller application 155, the VMM extension module 175 running in the context of the VMM 145, and the guest extension module 180 running in the context of the virtual machine 130.

In certain implementations, the VMM extension module 175 may implement antivirus functionality by filtering I/O and memory access requests initiated applications running on virtual machine 130 and disabling certain requests that match certain configurable patterns. Common implementations of antivirus functionality are fully performed within a privileged guest application, and thus may adversely affect the guest performance by triggering a large number of VM exits responsive to attempts to execute certain privileged I/O or memory access operations. In accordance with one or more aspects of the present disclosure, certain operations that would commonly be executed by a guest-side antivirus application may be offloaded to the VMM extension module 175. Such operations may include tracking and filtering memory accesses, disk accesses, network interface controller accesses, etc.

Figure 2:
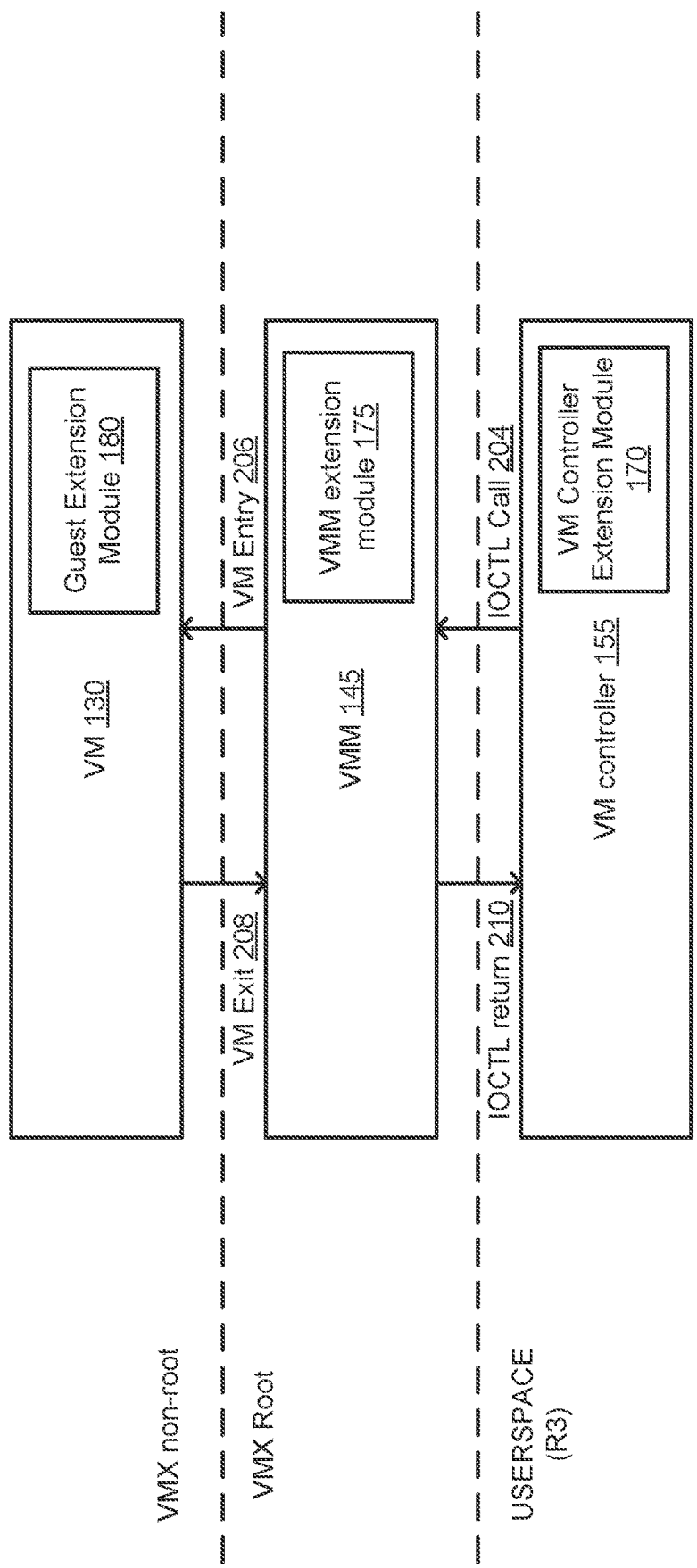
FIG. 2 depicts an example interaction diagram illustrating the sequence of interactions of components of an example computer system for processing virtual machine I/O requests by virtualization extension modules, in accordance with one or more aspects of the present disclosure.

FIG. 2 depicts an example interaction diagram illustrating the sequence of interactions of components of an example computer system for processing virtual machine I/O requests by virtualization extension modules, in accordance with one or more aspects of the present disclosure. As schematically illustrated by FIG. 2, a guest application running on the virtual machine 130 may issue a request to access a specified physical sector of a hard disk. The guest driver may translate the request into an asynchronous DMA request to the guest API 185. The API call may receive one or more parameters of the operation to be performed (e.g., the physical sector number, etc.), write the parameter values into one or more general purpose registers of the corresponding virtual processor, and invoke a custom PCI device driver for a fictitious PCI device that implements DMA functionality. In certain implementations, at least part of the custom PCI device driver may be implemented by the guest extension module 180.

Responsive to receiving the I/O operation request, the custom PCI device driver may allocate one or more memory buffers to be used for DMA transfer by the associated peripheral device (e.g., the hard disk controller). The custom PCI device driver may then generate a hardware interrupt, and cause the currently active guest processing thread to transition to a sleeping state (so that the scheduler would be able to schedule a time slot for the next runnable process). The hardware interrupt would trigger a VM exit 208 thus transferring the execution control to the VMM extension module 175.

Responsive to receiving the execution control triggered by the VM exit 208, the VMM 145 may identify, based on one or more parameters of the received request, a VMM extension module 175 to process the request. The request parameters may include the request type, the identifier of the application issuing the request, current privilege level of the application issuing the request, a device identifier, and/or a memory address. The identified VMM extension module 175 may inspect the request and/or perform some additional request processing before transferring the execution control to VM controller application 155 for the request execution. In certain implementations, the request inspection may involve attempting to match the request parameters to certain configurable patterns.

In certain implementations, the request inspection patterns to be implemented by the VM controller application 155 may be configured by one or more messages initiated by the guest extension module 180. Such configurable patterns may specify various combinations of values, including request types, application identifiers, current execution mode privilege levels, device identifiers, and/or memory addresses.

Should the request parameters match a request inspection pattern, the VMM extension module 175 may abort the request processing by writing a corresponding error code into a pre-defined general purpose register of the corresponding virtual processor and returning the execution control back to the virtual machine 130 by executing a VM entry instruction 206 (e.g., VMRESUME). Otherwise, if the request parameters do not match any request inspection pattern, the VMM extension module 175 may proceed to execute the request: restore the previously saved host context and transfer control to VM controller application 155 by returning from the IOCTL call 210 that was executed by the VM controller application 155 to cause the guest code execution. Responsive to receiving the execution control, the VM controller application 155 may analyze the cause of the VM exit (e.g., by executing API calls to the hypervisor 160 and/or VMM 145 to read VMCS fields and/or guest registers or by analyzing information received within a corresponding API request from the VMM). Then, the VM controller application 155 may invoke the VM controller extension module 170 to initiate the requested operation (e.g., append the I/O request to a queue of I/O requests to be processed by a dedicated thread running within the context of the VM controller application 155), and, without waiting for completion of the requested I/O operation, continue executing the guest code by executing a new IOCTL call 204 to the VMM 145. The VMM 145 may then return the execution control back to the virtual machine 130 by executing a VM entry instruction 206 (e.g., VMRESUME).

In certain implementations, the VMM extension module 175 may export a callback interface that would be invoked prior to invoking a certain function of the VMM API 150. Responsive to being invoked, a configurable callback handler may modify certain request parameters and/or abort the request before returning the execution control to the VMM extension module 175. The VMM extension module 175 may further export another callback interface that would be invoked prior to invoking a certain function of the VMM API 150 to notify a configurable callback handler of the API function to be executed, but without providing the callback handler the ability to modify the request parameters and/or abort the request. One or both callbacks may be configured by the guest extension module 180 and/or guest application 140 in order to provide, e.g., antivirus or code profiling functionality.

Figure 3:
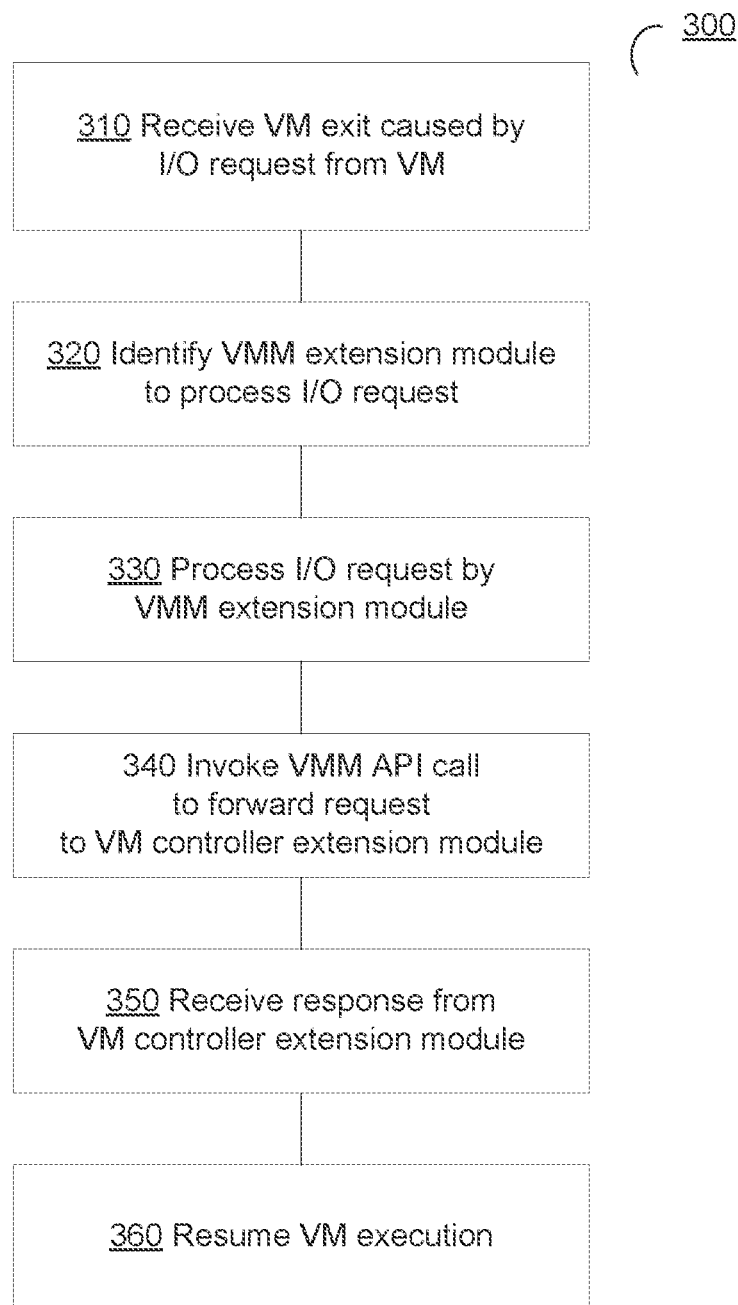
FIG. 3 depicts a flow diagram of an example method of processing virtual machine I/O requests by virtualization extension modules, in accordance with one or more aspects of the present disclosure.

FIG. 3 depicts a flow diagram of an example method 300 of processing virtual machine I/O requests by virtualization extension modules, in accordance with one or more aspects of the present disclosure. The method 300 and/or each of its individual functions, routines, subroutines, or operations may be performed by one or more processing devices of the computer system (e.g., computer system 100 of FIG. 1) implementing the method. In certain implementations, the method 300 may be performed by a single processing thread. Alternatively, the method 300 may be performed by two or more processing threads, each thread executing one or more individual functions, routines, subroutines, or operations of the method. In an illustrative example, the processing threads implementing the method 300 may be synchronized (e.g., using semaphores, critical sections, and/or other thread synchronization mechanisms). Alternatively, the processing threads implementing method 300 may be executed asynchronously with respect to each other.

At block 310, the virtual machine monitor (VMM) running on the host computer system may receive a VM exit caused by an I/O request initiated by a virtual machine managed by the VMM. The request may be represented by a synchronous or asynchronous I/O request and may, in various illustrative example, be initiated by the virtual machine's executing a pre-defined instruction of the emulated instruction set, an I/O operation with respect to a pre-defined I/O port, or a call to a custom PCI device driver. Issuing the request may cause a VM exit, thus transferring the execution control to the VMM, as described in more details herein above.

At block 320, the VMM may identify, based on one or more parameters of the received request, a VMM extension module to process the request. The request parameters may include the request type, the identifier of the application issuing the request, current privilege level of the application issuing the request, a device identifier, and/or a memory address, as described in more details herein above.

At block 330, the VMM extension module may process the received request, as described in more details herein above. In certain implementations, processing the received request may involve attempting to match one or more request parameters to a request inspection pattern. In an illustrative example, the request inspection pattern may be represented by a combination of the request type, an identifier of the application issuing the request, the current privilege level of the application issuing the request, a device identifier or a memory address. Responsive to successfully matching one or more request parameters to a request inspection pattern, the VMM extension module may raise a guest execution exception, and resume the virtual machine execution, as described in more details herein above.

Otherwise, if none of the request inspection patterns matches the request parameters, the VMM extension module may, at block 340, perform an action identified by the parameters of the request. In an illustrative example, such an action may involve invoking a VMM API call to forward the I/O request to the virtual machine controller extension module, as described in more details herein above.

Responsive to receiving, at block 360, a response from the virtual machine controller extension module, the VMM extension module may, at block 370, write one or more response parameters to one or more general purpose register of the corresponding virtual processor, as described in more details herein above.

At block 380, the VMM extension module may resume execution of the virtual machine, as described in more details herein above, and the method may terminate.

Figure 4:
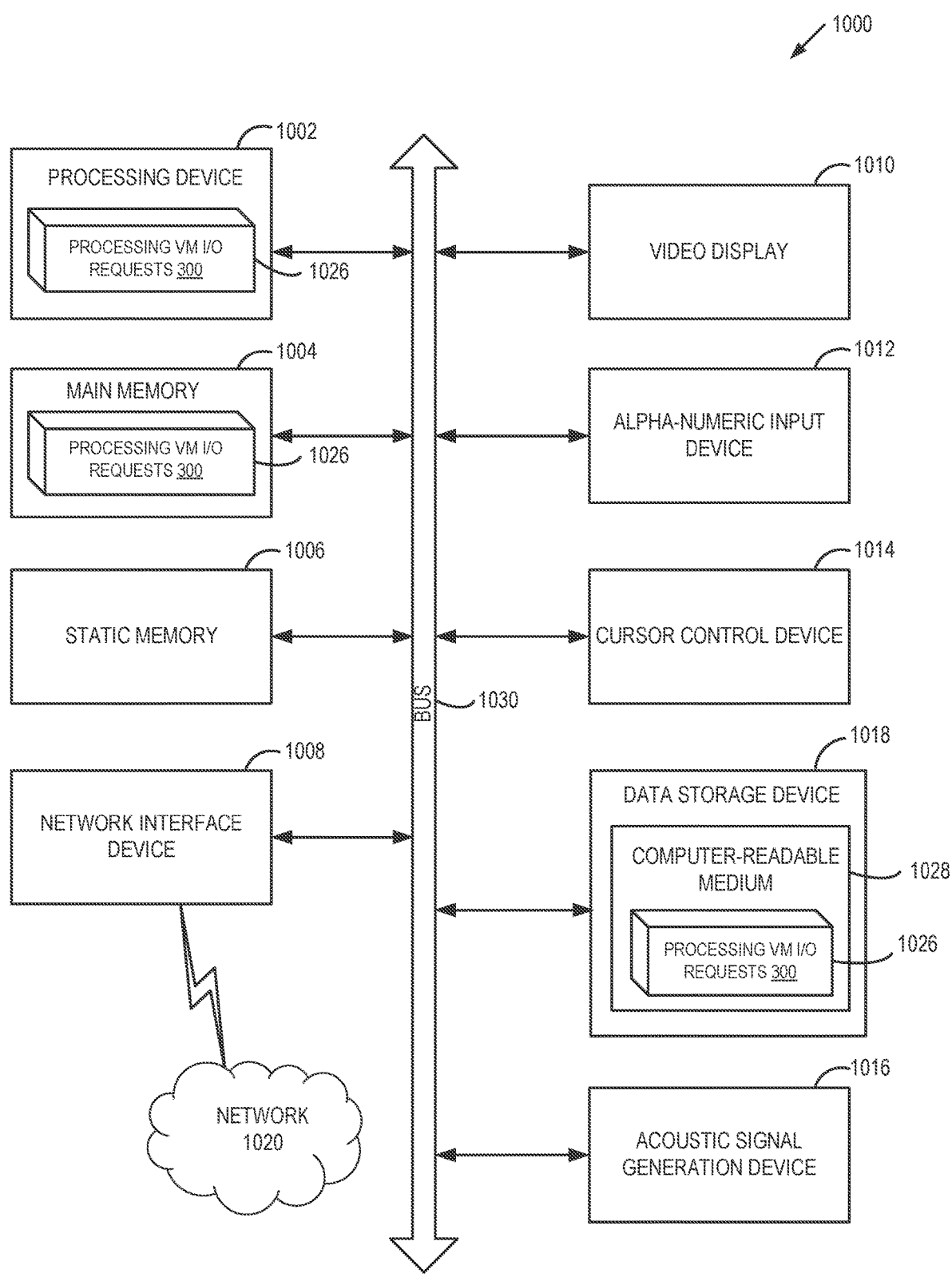
FIG. 4 depicts a block diagram of an example computer system operating in accordance with one or more aspects of the present disclosure.

FIG. 4 schematically illustrates a component diagram of an example computer system 1000 which may perform any one or more of the methods described herein. In various illustrative examples, the computer system 1000 may represent the example computer system 100 of FIG. 1.

The example computer system 1000 may be connected to other computer systems in a LAN, an intranet, an extranet, and/or the Internet. The computer system 1000 may operate in the capacity of a server in a client-server network environment. The computer system 1000 may be a personal computer (PC), a set-top box (STB), a server, a network router, switch or bridge, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

The computer system 1000 may comprise a processing device 1002 (also referred to as a processor or CPU), a main memory 1004 (e.g., read-only memory (ROM), flash memory, dynamic random access memory (DRAM) such as synchronous DRAM (SDRAM), etc.), a static memory 1006 (e.g., flash memory, static random access memory (SRAM), etc.), and a secondary memory (e.g., a data storage device 1018), which may communicate with each other via a bus 1030.

The processing device 1002 represents one or more general-purpose processing devices such as a microprocessor, central processing unit, or the like. More particularly, the processing device 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 1002 may also be one or more special-purpose processing devices such as an application specific integrated circuit (ASIC), a field programmable gate array (FPGA), a digital signal processor (DSP), network processor, or the like. In accordance with one or more aspects of the present disclosure, the processing device 1002 may be configured to execute instructions implementing the method 300 of processing virtual machine I/O requests by virtualization extension modules.

The computer system 1000 may further comprise a network interface device 1008, which may be communicatively coupled to a network 1020. The computer system 1000 may further comprise a video display 1010 (e.g., a liquid crystal display (LCD), a touch screen, or a cathode ray tube (CRT)), an alphanumeric input device 1012 (e.g., a keyboard), a cursor control device 1014 (e.g., a mouse), and an acoustic signal generation device 1016 (e.g., a speaker).

The data storage device 1018 may include a computer-readable storage medium (or more specifically a non-transitory computer-readable storage medium) 1028 on which is stored one or more sets of executable instructions 1026. In accordance with one or more aspects of the present disclosure, the executable instructions 1026 may comprise executable instructions encoding various functions of the method 300 of processing virtual machine I/O requests by virtualization extension modules.

The executable instructions 1026 may also reside, completely or at least partially, within the main memory 1004 and/or within the processing device 1002 during execution thereof by the computer system 1000, the main memory 1004 and the processing device 1002 also constituting computer-readable storage media. The executable instructions 1026 may further be transmitted or received over a network via the network interface device 1008.

While the computer-readable storage medium 1028 is shown in FIG. 4 as a single medium, the term "computer-readable storage medium" should be taken to include a single medium or multiple media (e.g., a centralized or distributed database, and/or associated caches and servers) that store the one or more sets of VM operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method comprising:
   receiving, by a virtual machine monitor (VMM) running on a host computer system, execution control via a virtual machine (VM) exit triggered by a virtual machine managed by the VMM;
   identifying, based on one or more parameters of the VM exit, a virtualization extension module of a plurality of virtualization extension modules;
   invoking, by the virtualization extension module of the plurality of virtualization extension modules, an application programming interface (API) exported by the VMM to perform an action identified by the one or more parameters of the VM exit; and
   resuming execution of the virtual machine; wherein
   when the VM exit has been triggered by an I/O request, the method further comprises:
      performing with the identified virtualization extension module of a plurality of virtualization extension modules a request inspection; and
      responsive to failing to match parameters of the I/O request to one or more request inspection patterns, forwarding the I/O request to a virtual machine controller running on the host computer system.

2. A method, comprising:

receiving, by a virtual machine monitor (VMM) running on a host computer system, execution control via a virtual machine (VM) exit triggered by a virtual machine managed by the VMM;

identifying, based on one or more parameters of the VM exit, a virtualization extension module of a plurality of virtualization extension modules;

invoking, by the virtualization extension module of the plurality of virtualization extension modules, an application programming interface (API) exported by the VMM to perform an action identified by the one or more parameters of the VM exit; and resuming execution of the virtual machine; wherein the VM exit has been triggered by a first input/output (I/O) request and wherein the action comprises transmitting, to an extension module of a virtual machine controller running on the host computer system, a second request associated with the first I/O request; and resuming execution of the virtual machine is performed responsive to receiving a response to the second request from the virtual machine controller.

3. A method, comprising:

receiving, by a virtual machine monitor (VMM) running on a host computer system, execution control via a virtual machine (VM) exit triggered by a virtual machine managed by the VMM;

identifying, based on one or more parameters of the VM exit, a virtualization extension module of a plurality of virtualization extension modules;

invoking, by the virtualization extension module of the plurality of virtualization extension modules, an application programming interface (API) exported by the VMM to perform an action identified by the one or more parameters of the VM exit; and resuming execution of the virtual machine; wherein the VM exit has been triggered by a first input/output (I/O) request and wherein the action comprises transmitting, to an extension module of a virtual machine controller running on the host computer system, a second request associated with the first I/O request; and the virtual machine controller is running in a user space context of the host computer system.

4. A method comprising:

receiving, by a virtual machine monitor (VMM) running on a host computer system, execution control via a virtual machine (VM) exit triggered by a virtual machine managed by the VMM;

identifying, based on one or more parameters of the VM exit, a virtualization extension module of a plurality of virtualization extension modules;

invoking, by the virtualization extension module of the plurality of virtualization extension modules, an application programming interface (API) exported by the VMM to perform an action identified by the one or more parameters of the VM exit; and resuming execution of the virtual machine; wherein when the VM exit has been triggered by an I/O request, the method further comprises:

performing with the identified virtualization extension module of a plurality of virtualization extension modules a request inspection; and responsive to failing to match parameters of the I/O request to one or more request inspection patterns, forwarding the I/O request to a virtual machine controller running on the host computer system; and the one or more request inspection patterns are configured by one or more messages triggered by a guest extension module forming part of the virtual machine.

5. A method comprising:

receiving, by a virtual machine monitor (VMM) running on a host computer system, execution control via a virtual machine (VM) exit triggered by a virtual machine managed by the VMM;

identifying, based on one or more parameters of the VM exit, a virtualization extension module of a plurality of virtualization extension modules;

invoking, by the virtualization extension module of the plurality of virtualization extension modules, an application programming interface (API) exported by the VMM to perform an action identified by the one or more parameters of the VM exit; and resuming execution of the virtual machine; wherein when the VM exit has been triggered by an I/O request, the method further comprises:

performing with the identified virtualization extension module of a plurality of virtualization extension modules a request inspection; and responsive to matching parameters of the I/O request to one or more request inspection patterns aborting the request processing and writing an error code into a predefined general purpose register of a virtual processor associated with the virtual machine.

6. A method comprising:

receiving, by a virtual machine monitor (VMM) running on a host computer system, execution control via a virtual machine (VM) exit triggered by a virtual machine managed by the VMM;

identifying, based on one or more parameters of the VM exit, a virtualization extension module of a plurality of virtualization extension modules;

invoking, by the virtualization extension module of the plurality of virtualization extension modules, an application programming interface (API) exported by the VMM to perform an action identified by the one or more parameters of the VM exit;

resuming execution of the virtual machine;

exporting with the identified virtualization extension module of a plurality of virtualization extension modules a configurable callback interface to be invoked prior to invoking a predetermined function of the API exported by the VM; and responsive to invoking the configurable callback interface executing a configurable callback handler; wherein the configurable callback handler in a first configuration modifies one or more parameters of the VM exit before returning execution control the identified virtualization extension module of a plurality of virtualization extension modules; and the configurable callback handler in a second configuration aborts a request before returning execution control the identified virtualization extension module of a plurality of virtualization extension modules.

* * * * *